United States Patent [19]

Armstrong

[11] Patent Number: 4,943,440

[45] Date of Patent: Jul. 24, 1990

[54] CONTROLLED ATMOSPHERE CUT VEGETABLE PRODUCE PACKAGE AND METHOD

[75] Inventor: Glenn S. Armstrong, Plymouth, Minn.

[73] Assignee: General Mills, Inc., Minneapolis, Minn.

[21] Appl. No.: 318,432

[22] Filed: Feb. 28, 1989

Related U.S. Application Data

[63] Continuation of Ser. No. 921,502, Oct. 22, 1986, abandoned.

[51] Int. Cl.$^5$ .......................... A23B 7/148; B65D 81/20
[52] U.S. Cl. .................... 426/118; 426/106; 426/124; 426/392; 426/395; 426/415; 426/419; 426/324
[58] Field of Search ............... 426/419, 415, 395, 396, 426/324, 316, 118, 124, 418, 106, 112, 392, 395

[56] References Cited

U.S. PATENT DOCUMENTS

| | | | |
|---|---|---|---|
| 2,611,709 | 9/1952 | Plagge | 426/419 |
| 3,102,777 | 9/1963 | Bedrosian et al. | 426/419 |
| 3,102,780 | 9/1963 | Bedrosian et al. | 426/419 |
| 3,239,360 | 3/1966 | Dixon | 426/419 |
| 3,450,542 | 6/1969 | Badran | 426/419 |
| 3,450,543 | 6/1969 | Badran et al. | 426/415 |
| 3,450,544 | 6/1969 | Badran et al. | 426/415 |
| 3,507,667 | 4/1970 | Magnen | 426/419 |
| 3,630,759 | 12/1971 | Rumberger | 426/415 |
| 3,795,749 | 3/1974 | Cummin et al. | 426/415 |
| 3,798,333 | 3/1974 | Cummin et al. | 426/415 |
| 3,804,961 | 4/1974 | Cummin et al. | 426/415 |
| 3,987,208 | 10/1976 | Rahman et al. | 426/415 |
| 4,001,443 | 1/1977 | Dave | 426/415 |
| 4,061,785 | 12/1977 | Nishino et al. | 426/419 |
| 4,079,152 | 3/1978 | Bedrosian et al. | 426/415 |
| 4,209,538 | 6/1980 | Woodruff | 426/419 |
| 4,224,347 | 9/1980 | Woodruff | 426/415 |
| 4,256,770 | 3/1981 | Rainey | 426/419 |
| 4,337,276 | 6/1982 | Nakamura et al. | 426/419 |
| 4,411,918 | 10/1983 | Ciminino | 426/124 |
| 4,411,921 | 10/1983 | Woodruff | 426/419 |
| 4,423,080 | 12/1983 | Bedrosian et al. | 426/415 |
| 4,515,266 | 5/1985 | Myers | 426/419 |
| 4,566,282 | 1/1986 | Knoblauch et al. | 426/419 |

FOREIGN PATENT DOCUMENTS

| | | | |
|---|---|---|---|
| 0153215 | 8/1985 | European Pat. Off. | 426/324 |
| 2033541 | 12/1970 | France | 426/415 |
| 53-8781 | 3/1978 | Japan | 426/415 |
| 60-141231 | 7/1985 | Japan | 426/324 |

OTHER PUBLICATIONS

Modern Packaging, 6/48, pp. 163–165.
American Soc. for Horticultural Science, V. 88, p. 311 plus.
Plant Disease Reporter, vol. 53, No. 7, p. 585 plus.
New Scientist, 8/14/86, p. 35 plus.
Food Packaging, 10/86, p. 42 plus.
Research on Quality Preservation Technique for Cut Vegetable Closed Up by Rapid Development of Catering Industry Packaging Japan 11/85.

Primary Examiner—Steven Weinstein
Attorney, Agent, or Firm—John A. O'Toole

[57] ABSTRACT

Disclosed are packaged cut product blends of vegetables salad mixtures for refrigerated storage which enjoy increased shelf life without the need for gas absorbents or anti-oxidants. The package includes a sealed imperforate container disposed within which are a quantity of perishable produce cut pieces with reduced respiratory rates in a bed having a bed depth of about 1 to 6 inches. The package includes an equilibrium headspace composition comprising by volume of 1.5 to 0.8% oxygen, 8 to 12% carbon dioxide and balance nitrogen which, surprisingly, is optimal for reduced aerobic respiration rates for substantially all cut produce blends. The package further includes a gas permeable portion such that about 18 to 32 cc. of oxygen is admittable to the package per 24 hr. per oz. of produce. In its method aspect, the present invention provides a method for reducing cell aerobic respiration rates and refrigerated packaging and storage of cut produce by flushing the container prior to sealing with a defined low oxygen high carbon dioxide initial atmosphere in a package of specified oxygen permeability.

20 Claims, No Drawings

CONTROLLED ATMOSPHERE CUT VEGETABLE PRODUCE PACKAGE AND METHOD

This is a continuation of U.S. patent application Ser. No. 921,502, filed Oct. 22, 1986, now abandoned entitled Controlled Atmosphere Cert Vegetable Produce Package and Method.

BACKGROUND OF THE INVENTION

1. Technical Field

The present invention relates to food products. More particularly, the present invention relates to a controlled atmosphere package for produce. In its method aspect, the present invention resides in methods for reducing respiration rates in a controlled manner of produce and for the refrigerated packaging and storage for extended periods.

2. The Prior Art

Present consumer food trends strongly favor increased consumption of fresh food, especially fruits and vegetables. Consumers are preparing increasing amounts of garden salads and fruit salads at home. Restaurants and food service providers are also increasing their offering of vegetable and/or fruit based salads in response to consumer desires.

While consumers find at-home salad consumption is desirable from the standpoint of nutrition, taste, etc., at-home salad preparation is time consuming especially for the small portions of salads typically consumed on a daily basis. For added convenience, cut produce blends suitable for quick salad preparation are available from many grocery stores. However, whether prepared at home or purchased from grocery stores, cut produce whether of one type or blends thereof typically have shelf-lives of only one to a few days. Deterioration of the cut produce is familiar to everyone and is characterized by browning of vegetables proximate their cut portions, wilting, color and flavor loss, loss of crisp texture, mold or rot, and the like.

Maintaining the flavor, texture and eating qualities of produce, from time of harvest through the time of purchase and actual consumption has been a problem of long-standing duration. The most common technique for preventing produce from reaching an over-ripe or deteriorated state has been to pick the produce in a relatively unripe state and to retard the ripening process by the use of refrigeration. Refrigeration is not without problems. For example, tropical and sub-tropical fruits, e.g., bananas are damaged quickly at refrigerated temperatures. Beans, cucumbers and tomatoes can discolor or ripen unevenly below 45° F. Some fruits become more susceptible to microbial attack.

It would be desirable, of course, to be able to extend the storage life of fresh, ripe produce such that the produce could be immediately consumed as well as stored in a ripe state for later consumption. The prior art also includes various packaging and handling techniques for the lengthened storage of whole vegetables and fruits. However, typically whole fruit or vegetable storage shelf life is much greater than cut produce shelf life due to the protective presence of a whole skin or other membranes. The principal mechanisms of decay are mold or fungal attack against the protective skin or cover and enzymatic degradation. Also, cutting produce greatly increases its respiration rate. Accordingly, the teachings with respect to lengthening the storage shelf life of whole fruits and vegetables provides very little practical or valuable guidance for providing packaging for cut produce to extend refrigerated shelf life. Due to the limited shelf life of present cut produce, preparation and sales by grocers of cut produce is primarily locally based. Extended shelf life of at least three weeks would be needed for production and sale on a regional or national scale which could take advantage of economies of scale in produce source procurement, processing, packaging and the like.

Cut produce stored at room temperature deteriorates very rapidly and is unacceptable after only one or two days. Refrigeration can extend shelf life up to about 7 days by reducing respiration rates. Prior efforts both in the U.S. and elsewhere for providing packaged cut produce with extended shelf life, i.e., more than 7 days when stored at refrigerated temperature, have relied upon manipulation of cellular respiration rates and use of chemical preservatives because unlike meat or fish, cut produce is still vital. Once cut off from the supply of nutrients, the cells of the produce contain a limited amount of stored energy. Generally, since cell respiration is also strongly influenced by the immediate atmosphere, one or more of three approaches have been taken to manipulate cellular respiration rates through atmosphere control. One approach is to manipulate and control the initial atmosphere sealed into the package. A second approach is to modify the internal package atmosphere by inclusion of either one or more gas absorbents or scavengers or gas releasants. Finally, the third approach is to control the gas permeability of the packaging material so as to control to ingress or egress of biologically significant gases.

U.S. Pat. No. to R. E. Woodruff 4,411,921 (issued Oct. 25, 1983) is exemplary of the first approach of providing initial atmosphere and discloses incorporation of elevated levels of CO and/or $CO_2$ with normal or reduced $O_2$ levels. In U.S. Pat. No. to Cimino 4,411,918, (issued Oct. 25, 1983) et al.) discloses apparatus for preserving food by generating preservative gas. U.S. Pat. No. to Bedrosian et al. 4,423,080 (issued Dec. 27, 1983) is exemplary of the second approach using gas absorbents and discloses using packets of chemical agents capable of absorbing moisture and carbon dioxide. Also representative of the absorption approach is U.S. Pat. No. to Nakamura et al. 4,337,276 (issued June 29, 1982) which discloses inclusion of zeolite, bentonite and activated carbon for absorption of released ethylene gas.

Representative of using more than one approach, namely controlling both the package gas permeability and providing a controlled initial atmosphere is U.S. Pat. No. to R. E. Woodruff 4,224,347 (issued Sep. 23, 1980) which discloses high $CO_2$ and CO initial levels and packaging material of specified gas permeability.

Notwithstanding the long-standing, widespread and intensive efforts of the prior art, the shelf life of refrigerated packaged cut produce blends to date is limited to at best 7 to 10 days. Modest improvements have been made with regard to longer storage of individual types of cut product. However, extension of shelf life of blends of cut produce with widely varying respiration rates and modes of shelf life failure, e.g., carrots and broccoli, remains in the art a difficult and unresolved problem. Accordingly, there is a continuing need for improved packaged cut produce blend products of extended refrigerated shelf life and method of produce storage and packaging.

SUMMARY OF THE INVENTION

In its product aspect, the present invention provides packaged cut produce having extended storage life when stored at refrigerated temperatures. The package comprises a quantity of cut perishable produce disposed in the container. The produce is in a bed having a thickness of about 1 to 6 inches. The produce is selected from the group consisting of broccoli, cauliflower, lettuce, cabbage, pea-pods or peas, beans, carrots, parsley, spinach, celery and mixtures thereof.

In its method aspect, the present invention resides in processes for reducing cell respiration rates for increasing the storage life of packaged cut produce. Fresh cut produce is packaged in a container having at least a portion fabricated from a gas permeable material of selected permeability and with defined initial flush gas. The produce is characterized by a reduced aerobic microbial load. The produce is then stored at refrigerated temperatures. The package is fabricated with a portion having sufficient gas permeability to allow infusion of about 18 to 32 cc. of oxygen to the package per ounce of produce per 24 hr.

The package is imperforate and is sealed with an initial flush atmosphere comprising about 2 to 7% oxygen, about 8 to 15% carbon dioxide and the balance nitrogen.

The package attains an equilibrium headspace gas within about 1 to 5 days comprising about 0.8 to 1.5% oxygen, about 8 to 12% carbon dioxide and the balance nitrogen.

The initial aerobic microbial load is less than about 100/g.

DETAILED DESCRIPTION OF THE INVENTION

The present invention provides packaged cut produce having an extended shelf life at refrigerated temperatures. In its method aspect, the present invention provides methods for reducing cell aerobic respiration rates in a controlled manner for packaging and storing cut produce to realize extended shelf life.

Throughout the specification and claims, percentages are by weight except for. gases which are by volume, and temperatures in degrees Fahrenheit, unless otherwise indicated.

Cut produce is obtained by means common in the art. The term "produce" is meant to include a wide variety of edible materials typically consumed as part of or as a salad which are biologically or respiratorily active or "fresh." The term is thus meant to include ordinary garden variety vegetables. Such vegetables include broccoli, cauliflower, lettuce, cabbage, pea-pods, beans, carrots, parsley, spinach, celery and mixtures thereof. However, due to their instability, the present produce blends cannot comprise tomatoes, red or green peppers, radishes, sprouts, mushrooms or cucumbers. While the present invention is useful for packaging individual produce types, the present invention finds particular usefulness in connection with blends of produce.

It is to be appreciated that the present invention finds utility for use in connection primarily with cut pieces of vegetable produce as distinguished from whole vegetables, e.g., whole broccoli or cabbage heads. The problems associated with cut produce are marketedly different from whole or uncut produce due, in part, to the exposure of interior portions of the produce to oxygen, greater surface area, cut tissue enzymatic activity, etc. compared to uncut produce which typically includes an intact protective skin or membrane. Of course, modest quantities, e.g., about 1% to 20% of whole produce, e.g., pea-pods, or beans or even selected whole or cut fruit pieces such as apples, pears, plums, pineapple, cherries, grapes and mixtures thereof, e.g., collectively less than about 50% of the cut vegetable produce blend can be intermixed with the cut produce without departing from the spirit of the present invention.

Surprisingly, the present invention can even be used with produce blends comprising about 5% to 30% of cut broccoli. Due to very high respiration rates, cut broccoli, particularly the florets, are especially difficult to provide with extended shelf life in mixed produce blends.

The size of the cut produce pieces is not critical per se, is difficult to consistently quantify and varies widely for leafy materials, e.g., spinach and lettuce from material which is frequently shredded, e.g., carrots and cabbage. However, good results are obtained when each product piece ranges in weight from about 1 to 10 g. As noted above, size however does affect respiration rate. Generally, however, the produce is cut or sliced as is done for conventional salads. A preferred size for lettuce is about 1.5 inches square per piece while celery is preferably about ¼ inch cubes.

A typical salad or cut produce blend useful herein are described as follows in Table 1.

TABLE I

| Vegetable | Broad Range | Preferred Range | Most Preferred |
|---|---|---|---|
| Lettuce | 10 to 80 | 30 to 50 | 40% |
| Broccoli | 5 to 30 | 10 to 20 | 15% |
| Cauliflower | 5 to 30 | 10 to 20 | 15% |
| Carrots | 3 to 30 | 10 to 20 | 15% |
| Celery | 7 to 30 | 10 to 20 | 15% |
| Cabbage | 0 to 30 | 10 to 20 | 15% |
| Spinach | 0 to 60 | 10 to 20 | 15% |
| Pea-Pods | 0 to 30 | 0 to 10 | 5% |
| Whole Beans | 0 to 30 | 0 to 10 | 5% |

It has been found important that the microbial load is critical to obtaining the extended shelf life benefits of the present invention. Typically, fresh produce will have a native or natural microbial load of about $10^6$/g measured by the aerobic plate counts ("APC"). It has been found important that the cut produce when packaged have an initial microbial load substantially reduced to less than about $10^3/g$ or a three order reduction, preferably about $10^2/g$. Of course, subsequent to packaging., the microbial load value will change.

The precise means used to achieve the reduced initial microbial load of 100/g are not critical, although it is important to follow good manufacturing practices in following the selected means. Good results have been obtained when a two-step wash procedure is employed. First, the produce pieces are washed in a cold water bath (less than about 45° F.) with mild agitation for a time sufficient to remove substantially any retained dirt or grime which may inactivate chlorine, typically about 3 to 5 minutes. Thereafter, the produce is washed in a second cold water bath containing about 100 to 250 ppm active chlorine, preferably 175 to 230 ppm, and about 200 ppm active chlorine for best results. Optionally, the aqueous chlorine bath can be buffered to a pH of about 5 to about 7 with an innocuous buffering salt, for example, potassium monobasic phosphate at a concentration of about 1%. The aqueous solution is maintained at a temperature of about 40° to about 60° F., preferably 40° to 45° F. The produce is advantageously dipped into the aqueous chlorine bath for a period of 1 to 2 minutes. A spray operation, to apply the aqueous chlorine to the produce, which provides an equivalent treatment in chlorine concentration temperature and time, may be used if desired.

When the produce includes modest, e.g., about 1% to 25% amounts cut fruit pieces, it is also desirable to inactivate surface browning enzymes. Enzyme inactivation can be readily accomplished by known methods such as by immersing the cut fruit pieces in a bath containing, for example, sulfites, e.g., sodium bisulfite at a level such as about 100 to 300 ppm or combination of ascorbic acid, citric, and sodium chloride at a level of about 1% to 3% each. The fruit pieces are mixed with mild agitation for about 5 to 10 minutes and removed from the bath. The enzyme inactivation step is preferably practiced after the aqueous chlorine wash step to avoid chlorine uptake by the cut tissue.

After application of the aqueous chlorine solution, the treated vegetable produce is drained immediately and adhered moisture from the aqueous chlorine solution is removed. Advantageously, to remove the adhering moisture as quickly as possible without damaging the produce, the cut produce is placed in a basket-type centrifuge which is rotated at, for example, 1600 RPM for 1.5 to 6 minutes. While this treatment removes adhering moisture, it does not dehydrate the vegetable thereby allowing it to remain with its natural water content. No residual chlorine is detected upon analysis of vegetables treated.

After removal of the adhering water, the produce is packaged in a sealable, imperforate but gas permeable and readily cold permeable container. The package or container may vary in size from and for an individual consumer size ranging from about 3 to 12 oz., preferably 6 to 10 oz. Any of a wide variety of packaging shapes and materials can be employed including trays, pouches, cups, bags and the like so long as the containers provide the requisite features described herein including gas permeability and provide protection from physical abuse.

It has also been surprisingly discovered that it is important not to add any acids or acidic material to the cut vegetable produce herein, i.e., that the cut produce be substantially free of acidic additives. For example, a product is now available and marketed primarily to the food service trade expressly for the shelf life extension of produce of commercial salad bars under the trademark FlavorBrite and comprising a mixture of citric and erythrobic or ascorbic acid. While such material may result in shelf life extension up to about two days at reduced temperature, such material has been found to affect adversely the present produce package's shelf life of at least four weeks. Any acidic flavorings or dressings, e.g., lemon juice or Italian dressing also are to be strictly avoided.

Gas permeability is important for its effect on cell respiration. Produce degradation is a complex phenomena dependent upon a variety of factors but especially upon cell respiration. Cell respiration is generally characterized by one of two opposing states, aerobic and anaerobic. Anaerobic respiration typically is the respiratory mechanism at oxygen levels below about 0.8% by volume under refrigerated conditions. Anaerobic respiration is to be strictly avoided due to its deleterious effect on cell vitality and the development of anaerobic respiration by-products such as alcohol aldehydes and/or putrification. Cabbages, for example, generate lactic acid and begin to sour and smell of sauerkraut. To extend shelf life, cell aerobic respiration must be maintained and slowed but not stopped. Thus, to maintain aerobic respiration, the oxygen level must be maintained at all times at at least 0.8%.

Unfortunately, the gas composition of a sealed container is an extremely complex relationship involving such interdependent factors as respiration rates, initial atmosphere, and gas transfer, if any, into the package as well as temperature. Not only do respiration rates vary with different amounts of oxygen and carbon dioxide, but also vary among produce types. For extended shelf life, the cells must be kept vital. To increase the duration of cell vitality, cell aerobic respiration rates must be reduced. It is important, however, that cell rates be reduced in a controlled manner. Aerobic respiration is generally expressed in terms of mg of $CO_2$ expired per kg per hour ("mg/kg-hr"). Broadly, cell respiration rates within the present invention are reduced by about 50 to 80% within a 1 to 5 day period, preferably within a 2-3 day period compared to refrigerated and room temperature respiration, respectively. Cell respiration if slowed too quickly can result in shock and ultimately in cell death. If, however, cell respiration rates are not slowed, the cells will rapidly consume their stored energy resulting in loss of weight and in decreased shelf life.

In addition to package permeability it has been found important that the present containers be sealed with a defined initial atmosphere or flush air composition in order to provide a controlled reduction in respiration rates which in turn aids in the extension of shelf life. The initial atmosphere desirably comprises of about 1.5 to 3% oxygen, preferably about 2.0 to 2.5% and for best results about 2.5%. Carbon dioxide desirably comprises of about 5 to 15%, preferably about 8 to 12% and for best results about 10%. The balance of the initial atmosphere desirably comprises of elemental nitrogen or $N_2$.

More surprisingly, the concentration of carbon monoxide has not been found to be critical within the above gas composition and concentration values notwithstanding previous art teachings or suggestions about the importance of carbon monoxide. Surprisingly, among the wide variety of produce types with varying contributions to the cut produce vegetable blend, that the above described initial gas composition is useful in providing a headspace gas which at refrigerator temperatures and in combination with other package features favorably results in slowed cell respiration rates.

The initial flush gas composition does not modify the ultimate headspace composition unless insufficient oxygen is present in the flush gas which can lead sooner or later to undesirably anaerobic respiration. Rather, the gas permeability and amount of produce, assuming constant refrigerated temperature, determine the equilibrium headspace composition. However, the flush gas does influence how quickly the equilibrium state is reached and avoids undesirable cell shock conditions occasioned by low oxygen levels. The influence of $CO_2$ in the flush gas is similar but inverse and less pronounced in its effects. Excessive oxygen fails to rapidly reduce respiration rates as does insufficient $CO_2$. However, excessive $CO_2$ levels in the flush gas can lead to browning damage to the produce. Without the initial flush gas, a cut produce blend otherwise similarly packaged and stored exhibits only about a one week shelf life.

The container although essentially imperforate must have some gas permeability. Typically, in the U.S., gas permeability is measured in cc per 100 square inches per 24 hours at 73° F. and one atmosphere of pressure (see American Society for Testing Materials or "ASTM" D1434-66) and often is further expressed as a function of thickness measured in mils. In shorthand, the value is expressed in "cc's" with the other units being understood. For most materials, permeability values among gases are directly proportional in a ratio of nitrogen to oxygen to carbon dioxide of 1:4:8. Thus, specification of, for example, oxygen, gas permeability will also quantify approximately carbon dioxide and water vapor transfer rates as well. By differential gas permeability is meant exotic materials which depart from this conventional direct relationship between gas molecular weight and permeability rates.

The prior art includes packages for produce having low permeability, high permeability and even differential gas permeability. In the present invention, however, it has been discovered that the operable relationship for the present package is between total permeability or gas permeability of the package and the amount of produce rather than permeability of the packaging material per square inch. The present containers essentially possess a ratio of oxygen permeability ranging from about 18 to 32 cc oxygen per day per oz. of produce, preferably about 25 to 30 cc $O_2$ per day. Importantly, the permeability will greatly influence the equilibrium headspace composition. Gas permeabilities outside the operable ranges given herein can result in equilibrium headspace compositions substantially different from those of the present invention with adverse reductions in the shelf life of the packaged cur produce.

Thus, surprisingly, a wide variety of packaging materials, thicknesses and construction can be used in the fabrication of the present invention and resort to expensive and exotic materials of particular gas permeability can be eliminated. To achieve the above permeability values various combinations of high permeability materials can be combined with low permeable or even impermeable materials. Such permeability values for packaging materials are known and are a common packaging material technical specification.

In one preferred embodiment, the present container includes a tray fabricated from a substantially gas impermeable material, (i.e., less than about 5 cc $O_2$) e.g., having a bottom or closed end, and if round, a circular side wall, or if rectangular, a pair of opposed spaced major side walls and a pair of opposed spaced minor side walls and an open end or top. Each of the side walls includes a peripheral shoulder around the open end and opposite to the bottom. The container further includes a closure membrane member peelably sealed to the shoulder. In the preferred embodiment, the closure membrane is fabricated from a flexible printable film having an intermediate oxygen permeability ranging from about 200 to 500 cc per 100 sq. in., preferably about 350 to 420 cc. An exemplary film is one fabricated from a laminate sheet stock having a first upper layer 1.75 mil in thickness of perforated polyethylene marketed under the trade name of Vispore ™, a second layer 0.75 mil in thickness of low density polyethylene with 12% ethylene vinyl acetate as the adhesive and available from Guardian Packaging Co. (Chicago, IL). This laminate provides an especially good seal to the tray. The tray generally measures 5×8×2 inches and holds about 6 to 8 oz. of produce. The permeable closure membrane thus measures about 5×8 inches and measures about 40 $in^2$ in surface area.

It has also been discovered that it is desirable from a practical standpoint that the vegetables be loosely packed forming a bed having bed depth or thickness ranging from about 1 to 6 inches, preferably about 2-3 inches. Excessive bed depths can undesirably lead to gas concentration gradients within the produce bed which can lead to a shortened shelf life. The minimum bed depth is primarily limited by the size of the produce pieces. Loose packing is valuable to prevent mechanical damage to the pieces as well as good gas circulation. In more preferred embodiments, the more structurally strong produce materials are layered or predominant in the lower bed, e.g., carrots, broccoli, while more delicate produce types, e.g., lettuce, celery, are layered or predominant at the top of the produce bed.

The treated and packaged salad of this invention is allowed to maintain the minimum necessary biochemical activity during its storage in the bag of specified permeability characteristics; hence, the freshness, crispness and unwilted appearance is maintained for a longer time at reduced but not frozen temperatures than conventionally treated and packaged salad preparations wherein the packaging film does not meet the specified permeability characteristics of the packaging material of this invention. Indeed, packaged fresh cut produce when processed and packaged according to the present invention having a shelf life of about 5 weeks when stored at 40° F. have been obtained without unacceptable deterioration. The package is desirably stored at conventional refrigerated temperatures, i.e., from about 34° to 50° F., preferably about 34° to 40° F.

The extended shelf life advantages have been obtained without the need for complex and costly gas absorbents or gas producers or from Packages fabricated with exotic materials.

However, while not essential, in one preferred embodiment it is contemplated that optionally the present packages can comprise conventional means for preventing condensation such as a means for absorbing water vapor, e.g., dessicants such as silica gels a standard meat pad (i.e., a water absorbente cellulosic pad within a perforated film cover) or the like. Such water absorption means should be segregated from the cut produce such as by being packaged in a separate pouch. In another preferred embodiment, care is taken such that the temperature to storage is held substantially constant, i.e., ±5° F., so as to avoid condensation of water vapor. The presence of liquid moisture can provide a breeding ground for aerobic bacteria which can lead undesirably to a shortened shelf life.

Optionally, the present cut vegetable blends can additionally comprise conventional levels of non-perishable or extended shelf life ingredients separately pouched such as nuts, croutons, Baco brand simulated bacon bits, cheese, luncheon meats and mixtures thereof.

Without further elaboration it is believed that one skilled in the art can, using the preceding description, utilize the present invention to its fullest extent. The following preferred specific embodiments are, therefore, to be construed as merely illustrative and not limitative of the remainder of the disclosure whatsoever. It will be appreciated that other modifications of the present invention, within the skill of those in the food arts, can be undertaken without departing from the spirit and scope of this invention.

The following examples illustrate that vegetables and especially cut vegetables sealed within packages with modified atmospheres according to this invention maintain color, flavor and appearance, while sealed, longer than they otherwise could.

Unless otherwise stated in the examples, all gas concentrations are stated in percentages by volume.

EXAMPLE 1

Vegetables selected were top quality without significant damage and were obtained as soon after harvest as possible. The processing room was maintained at 40–45° F. and was completely cleaned with a chlorine solution containing 200 ppm active chlorine. During processing all table surfaces, knives and cutting boards were sanitized and especially when switching vegetable components.

All vegetables were initially washed prior to blending with high pressure cold water for 5 minutes to remove dirt particles and lower the initial microbial load.

Each component was then trimmed to remove damaged tissue and outer leaves and then was hand cut to form pieces of the desired size. Thereafter a chlorine solution was maintained at 200 ppm active chlorine using diluted chlorine bleach and with aggitation of the vegetables. Ten pounds of vegetables were placed in a wire basket which was inserted into a 40 gallon drum containing the aqueous chlorine bath at 45° F. for one minute.

Prior to the chlorine bath, the APC was about $10^6$/g while after the chlorine bath was about 100/g.

Adhering solution was removed by centrifugation for 1–3 minutes depending upon vegetable type. No residual chlorine was detected in the washed vegetable.

The cut vegetables of reduced microbial load were then blended to form a cut produce blend having the following composition:

| Ingredient | % By Weight |
| --- | --- |
| Lettuce | 40 |
| Broccoli | 15 |
| Cauliflower | 15 |
| Carrots | 15 |
| Celery | 15 |
| | 100 |

The cut produce blend was then placed into a package comprising a Barex TM rectangular tray formed with dimensions of 5′×8′×2′. The tray was fabricated from a plastic which is essentially impermeable to gas transmission. The lid or closure membrane stock was selected from the previously described intermediate permeable laminate film available from Guardian Packaging (Chicago, IL) with a permeability of 420 cc $O_2$ and surface area of 40 sq. inches.

The tray was filled with 172 g of the cut blend of vegetables and was subsequently hermetically hand sealed on three sides. Via the open end and a nozzle arrangement the air was replaced with a sparge nozzle inserted into the still open end and the tray was flushed with a mixture of 2.5% $O_2$ and 10.0% $CO_2$. While flushing, the remaining side was sealed providing for a hermetically sealed container with the desired initial atmosphere.

The sealed container was placed in storage with a temperature variation of 40°–50° F.

An equilibrium atmosphere was gradually reached within 3 days and was maintained for 28 days without significant change. The equilibrium atmosphere consisted of 1.1% $O_2$ and 10.8% $CO_2$ as determined by gas chromotography, with the balance being nitrogen. The cut produce's condition was acceptable even up to 5 weeks after packaging.

At no time, even after 6 weeks of storage and well beyond the acceptable limits of a sensory panel, did the salad represent a potential consumer safety issue. The natural microflora remaining after cleaning outgrew any pathogenic organisms. This observation was confirmed by formal microbial challenge testing.

EXAMPLE 2

Cut Broccoli Florets

Top quality broccoli was purchased from a local supermarket and processed the same day as in Example 1.

The package consisted of a Barex TM tray, 5'×8'×2" and a closure member fabricated from 2.5 mil polyethylene film (280 cc $O_2$ permeability) as the lid stock.

Cut broccoli florets were placed into the package at a fill weight of 100 grams. The tray was hand sealed on three sides, flushed with an initial flush atmosphere comprising 2.5% $O_2$ and 10.0% $CO_2$ and the balance nitrogen and subsequently hermetically sealed. The package was stored at 40°–50° F. (temp. 745° F. 80%).

An equilibrium atmosphere was reached within two days and consisted of 3.5% $O_2$ and 8.5% $CO_2$.

Acceptable vegetable quality was maintained for seven weeks without loss of texture, flavor, color or the characteristic broccoli aroma.

EXAMPLE 3

Cut Lettuce

Top quality head lettuce was obtained from a local supermarket and cut into 1.5 in. square pieces, washed and treated with a chlorine bath as described in Example 1 within 24 hours. 200 g of the lettuce was placed in the substantially gas impermeable 5×8 ×2 tray described above in a bed of about ? having a closure membrane comprising 40 inches square of a film having a gas permeability or about 280 cc $O_2$. Thus, the infusion rate was about 15.68° cc $O_2$ per day per oz. of cut produce.

An equilibrium atmosphere to 13.5% $CO_2$ and 0.85% $O_2$ ($N_2$ balance) was reached within 2 days and maintained near this level or seven weeks. Product quality was judged equal to fresh for seven weeks.

EXAMPLE 4

A produce blend is made comprising head lettuce (20%), bib lettuce (10%), cauliflower (15%), broccoli (15%), carrots (10%), celery (10%) and romaine lettuce (10% prior to chlorine treatment. After cold water washing, the mixture is dipped for one minute in 200 ppm chlorine and centrifuged to achieve dewatering of the most sensitive component, lettuce.

The lettuce was packaged completely in a 5×8×2 inch tray to a bed depth of about 2 inches and containing about 300 g of produce. The package is then hand sealed on three sides, flushed and hermetically sealed on the fourth surface as in the above examples. The package is then refrigerated at 45° F. An equilibrium headspace composition of 1% oxygen and 10% $CO_2$ is reached in about two days.

What is claimed is:

1. A packaged food article for the extended refrigerated storage of cut fresh vegetable produce pieces, comprising;
    A. a sealed imperforate container;
    B. a quantity of a perishable fresh vegetable produce consisting essentially of a blend of ripe garden salad vegetables other than tomatoes, green peppers, red peppers, radishes, sprouts, mushrooms or cucumbers, in the form of cut pieces disposed within the container forming a produce bed having a bed depth ranging from about 1 to 6 inches,
    wherein the produce pieces each range in weight from about 1 to 10 g,
    said produce blend having at the time of packaging in said container an initial microbial load of less than about 1000 APC per gram of blend,
    said produce blend being a mixture of a plurality of vegetable species,
    wherein the container has an initial atmosphere at atmospheric pressure upon sealing within said container consisting essentially of
    1. about 1.5% to 7% by volume oxygen,
    2. about 8% to 15% by volume carbon dioxide, and
    3. the balance being substantially all molecular nitrogen,
    wherein the container has a portion fabricated from a gas permeable material sufficient to allow infusion into the package of about 18 to 32 cc of oxygen per day per ounce of the produce blend and wherein the container is substantially free of chemical agents capable of absorbing gases.
    wherein the package is refrigerated,
    said container and produce blend being selected such that the container has an equilibrium atmosphere within said container comprising
    about 0.8% to 1.5% by volume oxygen,
    about 8% to 12% by volume carbon dioxide, and the balance substantially all molecular nitrogen, said equilibrium atmosphere being obtained within one to five days of being sealed and refrigerated.

2. The package food article of claim 1 wherein the produce blend includes about 1% to 30% by weight of the blend or broccoli florets.

3. The packaged food article of claim 2 wherein the cut produce blend consists essentially of mixtures of broccoli, cauliflower, lettuce, cabbage, pea-pods, peas, beans, carrots, parsley, spinach, and celery.

4. The packaged food article of claim 3 wherein the initial atmosphere comprises 2.0% to 2.5% by volume of oxygen.

5. The packaged food article of claim 4 wherein the cut produce blend comprises by weight;
    about 10% to 80% lettuce,
    about 5% to 30% broccoli,
    about 5% to 30% cauliflower,
    about 3% to 30% carrots, and
    about 7% to 30% celery.

6. The packaged food article of claim 5 wherein the cut produce blend additionally comprises by weight;
    up to about 30% cabbage,
    up to about 60% spinach,
    up to about 30% pea-pods, and
    up to about 30% whole beans.

7. The packaged food article of claim 6 additionally comprising about 1% to 25% of cut fruit pieces selected from the group consisting of apples, citrus fruits, pineapple, pears, plums, cherries, grapes and mixtures thereof, said fruit pieces having inactivated surface enzymes.

8. The packaged food article of claim 7 wherein said gas permeable material is such as to allow infusion into the package of about 25 to 30 cc of oxygen per day per ounce of produce.

9. The packaged food article of claim 8 additionally comprising means for absorbing liquid water.

10. The packaged food article of claim 9 wherein said cut produce and said fruit pieces have an initial microbial load of less than about 100 APC per gram.

11. The packaged food article of claim 10 wherein the container comprises a tray fabricated from a substantially gas impermeable material having a closed bottom face, a side wall face and an open end opposite the bottom face, said side wall face having a peripheral shoulder around the open end and a closure member peelably sealed to the shoulder fabricated from a gas permeable material.

12. A method for increasing the storage life of refrigerated cut vegetable produce, comprising the steps in sequence of:
  A. washing a quantity of a perishable cut produce blend of ripe, fresh garden vegetables other than tomatoes, green peppers, red peppers, radishes, sprouts, mushrooms or cucumbers in the form of cut pieces in a cold water bath with mild agitation sufficient to remove substantially any retained dirt and grime to form a washed cut produce blend, said produce blend being a mixture of a plurality of vegetable species and wherein the cut produce pieces each range in weight from about 1 to 10 g;
  B. contacting the washed, cut produce blend with an aqueous solution containing about 100 to 250 ppm active chlorine at about 40° to 60° F. for a time sufficient to reduce the microbial load to less than about 1000 APC per gram of cut produce blend to form a washed cut produce blend of reduced initial microbial load;
  C. removing adhered mositure of the aqueous solution from the cut produce blend to form a dewatered cut produce blend;
  D. without further chemical treatment placing the dewatered cut produce blend into an imperforate hermetically sealable container to form a bed having a thickness ranging from about 1 to 6inches, said container having at least a portion fabricated from a gas permeable material having an oxygen gas permeability such as to allow infusion into the package of about 18 to 32 cc of oxygen per ounce of produce per 24 hr.;
  E. hermetically sealing within the container with said blend an initial modified atmosphere at atmospheric pressure consisting essentially of about 2% to 5% oxygen, about 8% to 15% carbon dioxide by volume, the balance substantially all molecular nitrogen;
  F. refrigerating the sealed container to reduce the respiration rate of the produce blend at least by 75% within 1 to 5 days and to form an equilibrium atmosphere within the container, and wherein said container and produce blends are selected such that said equilibrium atmosphere wherein said container comprises:
    about 0.8% to 1.5% by volume oxygen,
    about 8% to 12% by volume carbon dioxide, and the balance substantially all nitrogen,
    said equilibrium atmosphere being obtained from 1 to 5 days after sealing and wherein the container is substantially free of chemical agents capable of absorbing gases.

13. The method of claim 12 wherein the produce blend includes about 1% to 30% by weight of the blend of broccoli florets.

14. The method of claim 13 wherein the cut produce blend consists essentially of mixtures of broccoli, cauliflower, lettuce, cabbage, pea-pods, peas, beans, carrots, parsley, spinach, and celery.

15. The method of claim 14 wherein the initial modified atmosphere comprises
  2.0% to 2.5% by volume oxygen,
  8% to 12% by volume carbon dioxide
and the balance substantially all nitrogen
  and wherein the initial microbial load is less than about 100/g.

16. The method of claim 15 wherein the cut produce blend comprise by weight;
  about 10% to 80% lettuce,
  about 5% to 30% broccoli,
  about 5% to 30% cauliflower,
  about 3% to 30% carrots, and
  about 7% to 30% celery.

17. The method of claim 16 wherein the cut produce blend additionally comprises by weight;
  up to about 30% cabbage,
  up to about 60% spinach,
  up to about 30% pea-pods, and
  up to about 30% whole beans.

18. The method of claim 17 wherein the cut produce container additionally contains about 1% to 25% of cut fruit pieces selected from the group consisting of apples, citrus fruits, pineapple, pears, plums, cherries, grapes and mixtures thereof.

19. The method of claim 18 wherein the gas permeable material is such as to allow infusion into the container of about 25 to 30 cc of oxygen per day per ounce of produce.

20. The method of claim 19 wherein the container additionally comprises means for absorbing condensed water vapor.

* * * * *

UNITED STATES PATENT AND TRADEMARK OFFICE
CERTIFICATE OF CORRECTION

PATENT NO. : 4,943,440　　　　　　　　　　　　Page 1 of 2

DATED : July 24, 1990

INVENTOR(S) : Glenn S. Armstrong

It is certified that error appears in the above-identified patent and that said Letters Patent is hereby corrected as shown below:

Abstract, line 1 -- "product" should be -- produce --.

Col. 1, line 7 -- "Cert" should be -- Cut --.

Col. 3, line 59 -- After "for", delete the period.

Col. 8, line 7 -- "cur" should be -- cut --.

Col. 9, line 18 -- "Packages" should be -- packages --.

Col. 9, line 30 -- "temperature to" should be -- temperature of --.

Col. 10, line 37 -- "5' X 8' X 2'" should be -- 5" X 8" X 2" --.

Col. 11, line 10 -- "5' X 8' X 2"" should be -- 5" X 8" X 2" --.

Col. 11, line 36 -- "or" should be -- of --.

Col. 11, line 37 -- "15.68°" should be -- 15.68 --.

Col. 11, line 38 -- "to" should be -- of --.

Col. 11, line 40 -- "or" should be -- for --.

Col. 11, line 48 -- "(10% prior" should be -- (10%) prior --.

Col. 11, line 64 -- "prising;" should be -- prising: --.

UNITED STATES PATENT AND TRADEMARK OFFICE
CERTIFICATE OF CORRECTION

PATENT NO. : 4,943,440

DATED : July 24, 1990

INVENTOR(S) : Glenn S. Armstrong

It is certified that error appears in the above-identified patent and that said Letters Patent is hereby corrected as shown below:

Col. 12, line 25 -- "gases." should be -- gases, --.

Col. 12, line 35 -- "package" should be -- packaged --.

Col. 12, line 37 -- "or" should be -- of --.

Signed and Sealed this

Fourteenth Day of January, 1992

Attest:

HARRY F. MANBECK, JR.

*Attesting Officer*      *Commissioner of Patents and Trademarks*